United States Patent
Wilson et al.

(10) Patent No.: US 8,247,497 B2
(45) Date of Patent: Aug. 21, 2012

(54) POLYMER MOLDING COMPOSITIONS

(75) Inventors: Debra R. Wilson, Missouri City, TX (US); William J. Michie, Jr., Missouri City, TX (US); Spyro P. Petsalis, Katy, TX (US)

(73) Assignee: Dow Global Technologies LLC, Midland, MI (US)

( * ) Notice: Subject to any disclaimer, the term of this patent is extended or adjusted under 35 U.S.C. 154(b) by 397 days.

(21) Appl. No.: 11/578,983

(22) PCT Filed: May 5, 2005

(86) PCT No.: PCT/US2005/015623
§ 371 (c)(1),
(2), (4) Date: Oct. 18, 2006

(87) PCT Pub. No.: WO2005/121239
PCT Pub. Date: Dec. 22, 2005

(65) Prior Publication Data
US 2007/0213468 A1 Sep. 13, 2007

Related U.S. Application Data

(60) Provisional application No. 60/568,487, filed on May 6, 2004.

(51) Int. Cl.
*C08L 23/00* (2006.01)
*C08L 23/04* (2006.01)
*C08K 5/00* (2006.01)
(52) U.S. Cl. .................................... 525/240; 524/515
(58) Field of Classification Search .................. 524/515; 525/240
See application file for complete search history.

(56) References Cited

U.S. PATENT DOCUMENTS

| | | | |
|---|---|---|---|
| 4,076,698 A | 2/1978 | Anderson et al. | |
| 4,100,105 A | 7/1978 | Levine et al. | |
| 4,302,565 A | 11/1981 | Goeke et al. | |
| 4,482,687 A | 11/1984 | Noshay et al. | |
| 4,543,399 A | 9/1985 | Jenkins, III et al. | |
| 4,588,790 A | 5/1986 | Jenkins, III et al. | |
| 4,621,952 A | 11/1986 | Aronson | |
| 4,744,478 A | 5/1988 | Hahn | |
| 4,807,772 A | 2/1989 | Schloss | |
| 4,814,135 A | 3/1989 | Heitz | |
| 4,846,362 A | 7/1989 | Schloss | |
| 4,857,600 A | 8/1989 | Gross et al. | |
| 4,872,573 A | 10/1989 | Johnson et al. | |
| 4,984,703 A | 1/1991 | Burzynski | |
| 5,000,992 A | 3/1991 | Kelch | |
| 5,076,988 A | 12/1991 | Rifi | |
| 5,137,164 A | 8/1992 | Bayer | |
| 5,153,382 A | 10/1992 | Gross et al. | |
| 5,290,745 A | 3/1994 | Jorgensen et al. | |
| 5,292,845 A | 3/1994 | Kawasaki et al. | |
| 5,352,749 A | 10/1994 | DeChellis et al. | |
| 5,598,940 A | 2/1997 | Finkelstein et al. | |
| 5,844,045 A | 12/1998 | Kolthammer et al. | |
| 5,858,491 A | 1/1999 | Geussens et al. | |
| 5,869,575 A | 2/1999 | Kolthammer et al. | |
| 5,977,251 A | 11/1999 | Kao et al. | |
| 5,981,664 A | 11/1999 | Neumann et al. | |
| 6,022,933 A | 2/2000 | Wright et al. | |
| 6,139,931 A | 10/2000 | Finkelstein et al. | |
| 6,382,445 B1 | 5/2002 | McCandless | |
| 6,448,341 B1 | 9/2002 | Kolthammer et al. | |
| 6,538,070 B1 | 3/2003 | Cardwell et al. | |
| 6,566,446 B1 | 5/2003 | Parikh et al. | |
| 7,135,526 B2 * | 11/2006 | Farley et al. ................ 525/191 |
| 2004/0062942 A1 | 4/2004 | Lustiger et al. | |

FOREIGN PATENT DOCUMENTS

| | | |
|---|---|---|
| EP | 0 640 625 A2 | 3/1995 |
| EP | 0 771 820 A1 | 5/1997 |
| WO | WO-83/00490 | 2/1983 |
| WO | WO-97/36942 | 10/1997 |
| WO | WO-2004/094489 A1 | 11/2004 |

OTHER PUBLICATIONS

Williams, T. et al., "The Construction of a Polyethylene Calibration Curve for Gel Permeation Chromatography Using Polystyrene Fractions" Journal of Polymer Science, Polymer Letters, 1968, pp. 621-624, vol. 6, H.H. Wills Physics Laboratory, England.
Randall, James C., "Long-Chain Branching in Polyethylene", Rev. Macromol. Chem. Phys., 1989, pp. 285-297, C29(2&3), Marcel Dekker, Inc.
Anantawaraskul, Siripon, et al., "An Experimental and Numerical Study on Crystallization Analysis Fractionation (Crystaf)", Macromol. Symp., 2004, pp. 57-68, vol. 206, Department of Chemical Engineering, Canada.
Zhang, Yu-Dong et al., "13C NMR, GPC, and DSC Study on a Propylene-ethylene-1-butene Terpolymer Fractionated by Temperature Rising Elution Fractionation" Polymer Journal, 2003, pp. 551-559, vol. 35, No. 7, Beijing Research Institute of Chemical Industry, China.
Anantawaraskul, Siripon, et al., "Effect of molecular weight and average comonomer content on the crystallization analysis fractionation (Crystaf) of ethylene α-olefin copolymers" Can. Polymer, 2003, pp. 2393-2401, vol. 44(8), Department of Chemical Engineering, Canada.
Sarzotti, Deborah M. et al, "Ethylene/1-Hexene Copolymers Synthesized with a Single-Site Catalyst: Crystallization Analysis Fractionation, Modeling, and Reactivity Ratio Estimation" Journal of Polymer Science, Part B:Polmer Physics, 2002, pp. 2595-2611, vol. 40, Department of Chemical Engineering, Canada.
U.S. Appl. No. 11/121,353, filed May 3, 2005.

* cited by examiner

Primary Examiner — Mark Eashoo
Assistant Examiner — Angela C Scott

(57) ABSTRACT

The invention relates to formulated compositions which can be easily formed into bottle caps, without the need for a liner, while still maintaining pressure requirements, such as for carbonated beverages. The compositions may include an ethylene polymer having a density in the range of from about 0.947 to 0.962 g/cm$^3$, a melt index of from about 1 to about 10 g/10 min., and another ethylene polymer having a density in the range of from about 0.912 to 0.932 g/cm$^3$, a melt index of from about 0.25 to about 6 g/10 min., wherein the two ethylene polymers have a density difference of equal to or greater than 0.03 g/cm$^3$. In other cases, the composition may include a single component resin with a density in the 0.935-0.955 g/cm$^3$ range with a melt index in the range of 0.3-1.2 g/10 minutes, and wherein the resin comprises a polyethylene polymer.

13 Claims, No Drawings

POLYMER MOLDING COMPOSITIONS

CROSS REFERENCE TO RELATED APPLICATIONS

This application claims priority, pursuant to 35 U.S.C. §119 (e), to U.S. Provisional Patent Application No. 60/568,487, filed on May 6, 2004. That Application is incorporated by reference in its entirety.

BACKGROUND OF INVENTION

1. Field of the Invention

The invention relates generally to polymer compositions having desired properties. More particularly, embodiments of the invention relate to closures composed of polyethylene resin compositions.

2. Background of the Invention

This invention relates generally to polymer molding compositions useful for molding applications, and especially for screw closure applications. For screw closures, such as soda bottle caps, typically a polypropylene (PP) polymer is used as the cap closure for the needed strength, with an inner liner comprised of soft ethylene/vinyl acetate (EVA), PVC, SEBS, TPV or butyl rubber etc., to provide an excellent seal. However, this two part construction is costly and users are always looking for ways to solve problems at lower costs. It would be easier and more convenient to use a one piece closure, without a liner. However, such a design is difficult, because the cap closure must be strong enough to withstand the closure needs and soft enough to provide an excellent seal while not contaminating the taste or odor of the bottle contents. Specifically, the cap closure must hold the pressure of the contents and have good stress crack resistance and impact strength, in addition to good removal torque and strip torque requirements with excellent color.

With the advent of polyethylene-terepthalate (PET) soda bottles, polypropylene (PP) bottle cap resins were developed to fill the need for user-friendly, tamper-proof and low-cost closures for said bottles. The closure is in the form of a cap that is fitted on to the bottle having a tear off tab or security ring at the base as a tamper-proof feature. While the current PP closures are cheap, they are too stiff by themselves to form a gas tight seal with the bottle. So an ethylene vinyl acetate (EVA) copolymer or other liner was affixed in a second operation to the inner side of the PP cap as the sealing layer. This provides a soft polymer seal to provide a gas tight closure. This closure or cap construction functions well, but it is costly to produce due to the two part construction. Thus, there is a continuing need for new polymer solutions to satisfy or exceed the technical needs of the closure and to do so cheaper. This applies to both pressurized and non pressurized containers.

In attempts to solve this closure problem, there are many examples of polymer compositions useful for molding applications, including blends of linear low density polyethylene (LLDPE) with high density polyethylene (HDPE). For example, U.S. Pat. No. 5,981,664, the disclosure of which is incorporated herein by reference, discloses resin compositions for molding comprising 40-65% of an ethylene polymer having a density from 0.948 g/cm³ to 0.964 g/cm³, a melt flow index from 6 to 20 g/10 minutes and a mean molar mass distribution, Mw/Mn, from 2 to 5 and 35-60% of an ethylene polymer having a density from 0.935 g/cm³ to 0.953 g/cm³, a melt flow index from 0.1 to 0.35 g/10 minutes and a mean molar mass distribution, Mw/Mn, from 6 to 20, wherein the final composition has a density from 0.948 g/cm³ to 0.957 g/cm³, a melt flow index from 1.0 to 2.0 g/10 minutes and a mean molar mass distribution, Mw/Mn, from 3 to 10, and wherein the difference in densities of the two components is from 0 to 0.029 g/cm³. Such compositions are said to be useful for screw closures.

However, there is still a need for polymer formulations that can be molded into closures having acceptable properties, such as no need for liners, acceptable taste and odor, and satisfactory stress crack resistance and impact strength.

BRIEF SUMMARY OF THE INVENTION

In one aspect, the present invention relates to an ethylene polymer composition which, in certain embodiments, may be used to replace the polypropylene/ethylene-vinyl acetate (EVA) two part construction in prior art bottle cap applications, without the need for a liner. In selected embodiments, the composition has an environmental stress crack resistance (ESCR) of >80 hours in 100% Igepal (tested in accordance with ASTM D-1693 condition B), tensile yield of 3000 to 3400 psi, per ASTM D-638 when prepared and tested according to ASTM D-4976, but remains soft enough to seal the bottle so no gases escape and satisfies the cap machine turn-on torque or strip torque requirement.

In one aspect, the present invention relates to a composition that includes a single component resin with a density in the 0.935-0.955 g/cm³ range with a melt index in the range of 0.3-1.2 g/10 minutes, and wherein the resin comprises a polyethylene polymer.

In one aspect, the present invention relates to a composition includes from about 10 to about 90 weight percent of an ethylene polymer having a density in a range of from about 0.947 to 0.962 g/cm³, a melt index of from about 1 to about 10 g/10 minutes, from about 90 to about 10 weight percent of an ethylene polymer having a density in a range of from about 0.912 to 0.932 g/cm³, a melt index of from about 0.25 to about 6 g/10 minutes, and wherein a difference of densities of components (A) and (B) is ($\Delta D = D_{(A)} - D_{(B)}$) is equal to or greater than 0.03 g/cm³.

In one aspect, the present invention relates to a closure comprising at least one ethylene polymer characterized as having a short chain branching distribution content of equal to or greater than about 8% to about 25%.

In one aspect, the present invention relates to a method of forming a closure that includes modifying the composition of claim 1 or 7 to form a closure.

Other aspects and advantages of the invention will be apparent from the following description and the appended claims.

DETAILED DESCRIPTION OF THE INVENTION

As discussed above, embodiments of the present invention relate to ethylene polymer compositions having selected properties. In selected applications, compositions in accordance with embodiments of the present invention have an environmental stress crack resistance (ESCR) of >80 hours in 100% Igepal and (tested in accordance with ASTM D-1693 condition B), tensile yield of 3000 to 3400 psi, per ASTM D-638 when prepared and tested according to ASTM D-4976, but remains soft enough to seal the bottle so no gases escape, and satisfying the cap machine turn on torque requirement or strip torque.

As used herein, strip torque is defined as: the measure of torque that machine can apply to the bottle cap without stripping the treads. Ease of removal by a consumer is also required. This is typically defined as removal torque. Thermal cycling with $CO_2$ retention is also critical as is the cap design, thread strength (modulus), and speed bumps (which may or may not be used) which prevents the cap from popping off the bottle. The resulting cap should be treatable to 55 dynes for printing with solvent, water-based, UV-cured, or other inks. The contents of carbonated beverages typically are under a pressure of about 30 psi to about 60 psi, depending on the temperature.

Soda manufacturers often inject cold liquid with pressurized carbon dioxide, then bottle the drink under high pressure. This is because more gas will dissolve in a cold liquid that is under a high pressure than in a warm liquid that is not under pressure. The bubbles in such drinks simply do not only provide fizz, but also change the flavor of the drink. The carbon dioxide in the soda forms carbonic acid, which reduces the sweet taste of the drink. For this reason, flat soda oftentimes tastes much sweeter than when it is carbonated. The carbon dioxide not only alters flavor and mouth-feel, but also serves an anti-microbiological purpose. It has been shown to help prevent some microbes from growing inside of one's mouth, as well. Each type of soda drink contains a different amount of carbon dioxide, and thus has varying amounts of pressure. On average, the 12 ounce soda cans sold in the US have a pressure of roughly 120 kPa (17.4 psi) when canned at 4° C., and 250 kPa (36.3 psi) when stored at 20° C.

One application for ethylene compositions formed in accordance with embodiments of the present invention is that they may be formed into a cap for bottles, for example a soda bottle as described above.

Extrusion processing with acceptable power draws (motor load), head pressure development, specific output rates and surfaces free from imperfections and melt fracture, which may mar the appearance of the bottle cap, are also important properties to be built into the polymer or obtained through addition of various adjuvants.

Typically, blends of two polymers produce properties that are inferior to properties of the individual constituents or of a linear interpolation of the properties of the two constituents. However, surprisingly, in embodiments of the present invention, the present inventors have discovered that by judicious selection of blend components, substantially improved ESCR properties in the tensile yield range required for the application without loss in other critical performance properties may be achieved.

Compression molding produced caps using compositions in accordance with embodiments of the present invention have an excellent property balance with reduced cost to the manufacturer. The softness of the blend gives excellent cap sealability that meets the criteria. Thus, advantageously, embodiments of the present invention which use blends of components described below, show both utility and cost savings over the resins commonly used in bottle cap applications. The compositions can also be injection molded.

Blending of the resin components can be accomplished in any manner known to those of ordinary skill in the art. For example, blending may be accomplished through a dry blend of two components at the extruder. Alternatively, the polymer composition can be made using multiple reactors and/or multiple catalysts. This may be easily accomplished without incompatibility problems.

The present inventors have discovered polymer compositions suited for molding screw closures having good taste and odor properties, as well as sufficient stress crack resistance and impact strength. Such screw closures, when made from compositions of the invention, do not need liners. These compositions are based on thermoplastic polymers, especially ethylene polymers. The first of these polymer compositions comprise:

(A) from about 10 to about 90 weight percent of an ethylene polymer having a density in the range of from about 0.947 to about 0.962 g/cm$^3$, a melt index of from about 1 to about 10 g/10 minutes, preferably from about 2 to about 8 g/10 min, more preferably from about 3 to about 7 g/10 min., (B) from about 90 to about 10 weight percent of an ethylene polymer having a density in the range of from about 0.912 to about 0.932 g/cm$^3$, a melt index of from about 0.25 to about 6 g/10 minutes, preferably from about 0.5 to about 4 g/10 min., more preferably from about 0.75 to about 3 g/10 min., and (C) from 0 to 6 weight percent of additives selected from the group consisting of color enhancers, lubricants, fillers, pigments, antioxidants, and processing aids, a preferred range of from 0.01 to 3 weight percent and most preferred range as 0.015 to 0.5 weight percent, where the difference of the densities of components (A) and (B) ($\Delta D = D(A) - D(B)$) is equal or greater than 0.03 g/cm$^3$.

In another embodiment, the compositions comprise an ethylene polymer characterized as having a short chain branching distribution content of equal to or greater than about 8% to about 25%, preferably wherein the ethylene polymer comprises less than about 80% high density fraction.

In a further embodiment, the compositions are preferably characterized as having a 1-hexene content of from about 0.5 weight percent to about 5 weight percent, and more preferably characterized as having a soluble fraction greater than about 1.75% (determined via CRYSTAF).

Further, single component resin compositions are valued due to the simplicity of manufacture. In a second embodiment, a second type of polymer compositions comprising single component polymer compositions were discovered to be uniquely suited for molding screw closures having good tensile properties, good taste and odor properties, as well as sufficient stress crack resistance, impact strength and color. Such screw closures, when made from the compositions of the invention, do not need a liner. These compositions are based on thermoplastic polymers, especially ethylene polymers. Examples of such compositions comprise:

(A) a single component resin with a density in the 0.935-0.955 g/cm$^3$ range, preferably in the 0.938-0.952 range and most preferably in the 0.942-0.950 g/cm$^3$ density range with a melt index in the range of 0.3-1.2 g/10 min, preferably from 0.4-1.1 g/10 min, and most preferably from 0.5-1.0 g/10 min.

(B) from 0 to 6 weight percent of additives selected from the group consisting of color enhancers, lubricants, fillers, pigments, antioxidants, and processing aids, a preferred range of from 0.01 to 3 weight percent and most preferred range as 0.015 to 0.5 weight percent, In another embodiment, the compositions comprise an ethylene polymer characterized as having a short chain branching distribution content of equal to or greater than about 10% to about 24%, preferably wherein the ethylene polymer comprises less than about 60-85% high density fraction and from about 5-16% purge.

In a further embodiment the compositions are preferably characterized as having a 1-hexene content of from about 0.5 weight percent to about 5 weight percent, and more preferably characterized as having a soluble fraction greater than about 1.75% (determined via CRYSTAF).

In one embodiment of the present invention, a closure made from either polymer composition exhibits excellent removal torque, strip torque, and slip migration, and can secure seal up to 150 psi. Removal torque is the amount of rotational force necessary to loosen, open, or remove the closure from the bottle. According to one embodiment of the present invention, the closure has a removal torque in the range of about 7 to 17 inch-pounds. Strip torque, as noted above, is the measure of torque that machine can apply to the bottle cap without stripping the treads.

According to one embodiment of the present invention, the closure made from either polymer composition exhibits a strip torque in the range of about 20 to 50 inch-pounds. Slip levels in the range of about 500 to 3000 ppm slip agent are incorporated into the resin to effect slip migration. A typical slip agent is Erucamide. The closures have the ability to secure sealing up to 150 psi for testing purposes. Processing aids may also be incorporated to provide melt fracture free surfaces for aesthetics or ease of printing.

A closure, especially a screw closure, made from either type of these polymer compositions is also within the scope of the invention.

Those having ordinary skill in the art will recognize that the resins may be compounded (two polymer resins together (plus any additives) in the case of the blend, or a blend plus one or more additives) using techniques known in the art. Compounding of the components and additives is accomplished with standard compounding equipment known to those skilled in the art and include but is not limited to: twin screw mixers that are either co rotating or counter rotating, intermeshing or non intermeshing, having a one, two or more stages, with various screw configurations together with an in line melt pump to push the resin through a die plate for underwater pelletization. Alternatively, a banbury compounder with a single screw extruder and die plate for underwater pelletization can be employed.

The blend resin composition may be produced in two staged reactors connected in series with a catalyst fed into the first reactor via a catalyst feed tube, wherein a mixture of resin and active catalyst is transferred from the first reactor to the second reactor in which another polymer is prepared and blends in situ with the copolymer from the first reactor. More than two reactors can be used in this process if desired. The reactors can be independent reactors or stages within one reactor. The catalyst maybe a supported, unsupported, or in solution prior to feeding into the reactor. The catalyst may be continuously added to the reaction system to facilitate smooth operation, but can be interrupted for brief periods of time to facilitate changing the different catalyst batches.

The gaseous materials used in the process can be introduced into the reactors via a recycle gas. The recycle gas is defined as a mixture of gases including ethylene per se or ethylene and one or more alpha-olefins, preferably one or two alpha-olefins, as comonomers (alpha-olefin is required in the first reactor recycle gas and is optional in the second reactor recycle gas), and, optionally, one or more inert gases such as nitrogen (to make up the desired reactor pressure), inert hydrocarbons, and hydrogen. The alpha-olefins can be, for example, propylene, 1-butene, 1-hexene, 4-methyl-1-pentene, and 1-octene. The alpha-olefins usually have no more than 12 carbon atoms, preferably 3 to 8 carbon atoms. The recycle gas can also be referred to as the inlet gas or cycle gas.

Preferred comonomer combinations are as follows:

| first reactor | second reactor |
|---|---|
| 1-hexene | 1-hexene |
| 1-butene | 1-hexene |
| 1-butene | 1-butene |
| 1-hexene | 1-butene |

It is noted that an ethylene homopolymer can be made in the first or second reactors, preferably the second, if desired. It will be understood that generally the in situ blend can be characterized as a bimodal resin. In some cases, however, the two components making up the blend are sufficiently close in average molecular weight that there is no discernible discontinuity in the molecular weight curve.

For a staged reactor system, the proportion of each component may be controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements.

The single component resin composition can be produced in a single reactor system with a catalyst fed into the reactor via a catalyst feed tube. The catalyst may be a supported, unsupported, or in solution prior to feeding into the reactor. The catalyst may be continuously added to the reaction system to facilitate smooth operation, but can be interrupted for brief periods of time to facilitate changing different catalyst batches.

The gaseous materials used in the process can be introduced into the reactors via a recycle gas. The recycle gas is defined as a mixture of gases including ethylene per se or ethylene and one or more alpha-olefins, preferably one or two alpha-olefins, as comonomers and, optionally, one or more inert gases such as nitrogen (to make up the desired reactor pressure), inert hydrocarbons, and hydrogen. The alpha-olefins can be, for example, propylene, 1-butene, 1-hexene, 4-methyl-1-pentene, and 1-octene. The alpha-olefins usually have no more than 12 carbon atoms, preferably 3 to 8 carbon atoms. The recycle gas can also be referred to as the inlet gas or cycle gas.

Catalyst Description

The catalyst system can be exemplified by the magnesium/titanium catalyst system described in U.S. Pat. No. 4,302,565. That patent is incorporated by reference in its entirety. Another catalyst system is one where the precursor is formed by spray drying and used in slurry form. Such a catalyst precursor, for example, contains titanium, magnesium, and an electron donor, and, optionally, an aluminum halide. The precursor is then introduced into a hydrocarbon medium such as mineral oil to provide the slurry form. This spray dried catalyst is described in U.S. Pat. No. 5,290,745, which is incorporated by reference in its entirety. These catalyst systems can be referred to as Ziegler-Natta catalyst systems.

Typical magnesium/titanium based catalyst systems can be described as follows: The precursor can have the formula $Mg_d Ti(OR)_e X_f (ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group may be the same or different; X is independently chlorine, bromine or iodine; ED is an electron donor; d is 0.5 to 56; e is 0, 1, or 2; f is 2 to 116; and g is 1.5d+2. It may be prepared from a titanium compound, a magnesium compound, and an electron donor. Titanium compounds, which are useful in preparing these precursors, have the formula $Ti(OR)_e X_h$ wherein R, X, and e are as defined above; h is an integer from 1 to 4; and e+h is 3 or 4. Some specific examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. $TiCl_3$ and $TiCl_4$ are preferred compounds. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compound.

The electron donor is an organic Lewis base, preferably a liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

The catalyst precursors may be pre-activated before converting into catalysts. The precursor activator compound used in the partial pre-activation step can be one compound or a mixture of two different compounds. Each compound can have the formula M(Rn)X(3−n) wherein M is Al or B; each X is independently chlorine, bromine, or iodine; each R is independently a saturated aliphatic hydrocarbon radical having 1 to 14 carbon atoms, provided that when M is Al, n is 1 to 3 and when M is B, n is 0 to 1.5. Examples of the R radical are methyl, ethyl, n-butyl, isobutyl, n-hexyl and n octyl. Examples of n when M is aluminum are 1, 1.5, 2 and 3. Examples of n when M is boron are 0, 1 or 1.5. Preferred activator compounds include diethyl aluminum chloride, triethyl aluminum, tri-n-hexyl aluminum, dimethyl aluminum chloride, and tri-n-octyl aluminum. Particularly preferred activator compounds are: a sequential mixture of diethylaluminum chloride and tri-n-hexylaluminum; a sequential mixture of diethylaluminum chloride and triethylaluminum; and either diethyl aluminum chloride or tri-n-hexyl aluminum.

The partial activation of the precursor is carried out prior to the introduction of the precursor into the reactor. The partially activated catalyst can function as a polymerization catalyst but at greatly reduced and commercially unsuitable catalyst productivity. Complete activation in the polymerization reactor by additional cocatalyst is required to achieve this full activity.

In a preferred mode (sometimes referred to as an in-line reduction system), the precursor is introduced into a hydrocarbon solvent slurry feed tank; the slurry then passes to a static mixer immediately downstream of an activator injection port where the slurry is mixed with the activator; then the mixture passes to a second static mixer immediately downstream of a second activator injection port where it is mixed with the second activator. The static mixers may be positioned vertically. Acceptable mixing can be provided by a 2 foot (32 element) Kenics™ static mixer. This low energy mixer functions by constantly dividing the flow and reversing flow directions in a circular pattern in the direction of the flow in the tube associated with the mixer. Depending on the activator compound used, some reaction time may be required for the reaction of the activator compound with the catalyst precursor. This is conveniently done using a residence time zone, which can consist either of an additional length of slurry feed pipe or an essentially plug flow holding vessel. A residence time zone can be used for both activator compounds, for only one or for neither, depending entirely on the rate of reaction between activator compound and catalyst precursor.

The entire mixture is then introduced into the reactor, in this case, the first reactor, where the activation is completed by the cocatalyst. The partial activation is normally effected at temperatures in the range of about 10 to about 60 degrees C., preferably about 30 to about 45 degrees C. The molar ratio of each precursor activator compound to electron donor can be within the range of about 0.1:1 to about 0.6:1. Both the numerator and the denominator of the ratios represent, respectively, the total amount of precursor activator compounds and the total amount of electron donors used in the process.

The molar ratio of activator to titanium can be in the range of about 0.1:1 to about 8:1 and is preferably in the range of about 1:1 to about 5:1 The hydrocarbon used for the formation of the slurry can be any essentially air and moisture free aliphatic or aromatic hydrocarbon which is unreactive with both the catalyst precursor composition and the catalyst activator compounds, the catalyst precursor, the precursor activator compounds, and the cocatalyst.

In practice, since many of the final polymer products find end uses in food packaging, aromatic hydrocarbons would not be a preferred slurry solvent. The hydrocarbon slurry solvent is typically chosen from hydrogenated "mineral oils" or naphthenic oils of relatively high viscosity to minimize settling of catalyst solids in feed tubes and the like, although, with appropriate engineering design, lower viscosity solvents such as isopentane, hexane and heptane can be used as slurry solvents. These are not particularly preferred due to the additional complexity introduced by use of a lower viscosity and more easily settled slurry as catalyst. The viscosity of the hydrocarbon slurry solvent is sufficiently low so that the slurry can be conveniently pumped through the pre-activation apparatus and eventually into the polymerization reactor. Preferred solvents are aliphatic hydrocarbons with viscosity greater than about 50 centipoise (cps), particularly greater than about 100 cps and less than about 5,000 cps. Particularly preferred solvents are napthenic mineral oils typified by materials such as the Kaydol series of food grade mineral oils supplied by Witco under the trademark Kaydol®, Hydrobrite 380 and Hydrobrite 550.

The cocatalyst, generally a hydrocarbyl aluminum cocatalyst, can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutyl-hexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, diisobutylaluminum chloride, and ethylaluminum sesquichloride. Cocatalyst is introduced in a sufficient amount to provide an added Al:Ti atomic ratio of about 10:1 to about 100:1, and preferably greater than about 20:1 to about 50:1 Al:Ti. This amount will complete the activation of the precursor.

It is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support.

Impregnation of the above mentioned catalyst precursor into a silica support can be accomplished by mixing the precursor and silica gel in the electron donor solvent or other solvent followed by solvent removal under reduced pressure. The resultant solid catalyst is then converted into a free flowing slurry with an aliphatic hydrocarbon as described above such that it is pumpable as a liquid into the process. Catalyst precursors such as those described in U.S. Pat. No. 5,290,745 and European Patent Application 771 820 are particularly useful in the process of subject invention when placed into a hydrocarbon slurry in the unactivated state.

As noted, the precursor is partially activated before polymerization. Activation is completed in the reactor via the cocatalyst. The cocatalyst is preferably added separately neat or as a solution in an inert solvent, such as isopentane, to the polymerization reactor at the same time as the flow of ethylene is initiated.

In a separate embodiment, a second type of catalyst based on chromium is used in a single reactor configuration, although it is not limited to a single reactor and can be used in two or more reactors in series.

Polyethylene resins polymerized from these chromium based catalysts and methods to make them, are generally known in the art. This includes gas-phase, solution phase and slurry-phase polymerization processes. Of particular interest to the present invention are resins made in the gas-phase process, those made using a chromium catalyst, and in particular, a titanated chromium catalyst.

Typical, useful catalysts consists of a chromium (VI) compound (typically as the oxide) supported on a high surface area refractory oxide support. Generally the support is an amorphous microspheroidal silica, silica alumina, silica titania or aluminophosphate. The catalyst is prepared by activating the chromium-containing support at temperatures of 400-1000° C., in a dry, oxygen-containing atmosphere. Modifying materials such as titanium and fluoride are generally added prior to the activation.

Generally, catalysts are prepared by using commercially available silica to which a chrome source has been added. The silica substrate may be treated with a titanium ester (titanium tetraisopropylate or titanium tetraethoxide are typically used) either after the Cr compound is deposited or prior to this deposition. The support is generally pre-dried at about 150-200° C. to remove physically adsorbed water. The titanate may be added as a solution to a slurry of the silica in isopentane solvent or directly into a fluidized bed of support. If added in slurry form, the slurry is dried. Generally, the Cr compound which is convertible to $Cr^{+6}$ has already been added to the support. The support is then converted into active catalyst by calcination in air at temperatures up to 1000° C.

During activation, the titanium is converted to some type of surface oxide. The chromium compound (generally chromium (III) acetate) is converted to a $Cr^{+6}$ oxide of some kind. Fluoridation agents may also be added during the activation process to selectively collapse some pores in the support, modifying the molecular weight response of the catalyst. The activated catalyst may also be treated with reducing agents prior to use, such as carbon monoxide in a fluidized bed, or other reducing agents, such as aluminum alkyls, boron alkyls, lithium alkyls and the like.

Catalysts of this type are described in numerous patents, such as WO2004094489, EP0640625, U.S. Pat. No. 4,100,105, and the references cited therein. Each of these references is incorporated, in its entirety, by reference. For example, a useful catalyst is a supported chromium-titanium catalyst (or titanated chrome oxide catalyst) which is substantially non-spherical or irregular in shape, and has a broad particle size distribution, with at least 70% of its pore volume ranging in pores of diameter between about 200 to 500 Angstroms. Such a supported complex can be activated by heating in the presence of oxygen, at a temperature from about 850° C. to the sintering temperature of the supported complex. Catalysts such as those described in U.S. Pat. No. 6,022,933, also containing a $Cr^{+6}$ component, are also useful in the invention. This reference is also incorporated herein, in its entirety, by reference.

Specific Catalyst Description for the Blend Composition

To prepare the blend components, a titanium trichloride catalyst precursor is prepared by first producing a solution of magnesium chloride and titanium trichloride in tetrahydrofuran. A nitrogen atmosphere (less than 5 ppm $H_2O$) is maintained at all times.

Tetrahydrofuran (THF) containing less than 200 ppm $H_2O$ is added to the vessel. The moisture level is analyzed and a sufficient amount of triethylaluminum is added to react with the water. The THF is heated to a temperature of 50 degrees C., and granular magnesium metal and titanium tetrachloride are added. Sufficient titanium tetrachloride is added to produce a solution with a Ti content of 0.09-0.10 millimoles/gram of solution. Magnesium metal is added at a 0.5/1 molar ratio to the titanium tetrachloride. The titanium tetrachloride is added over a period of about one-half hour.

The mixture is continuously agitated. The temperature is held at about 70 degrees C. by heating for approximately another four hours. At the end of this time, essentially anhydrous magnesium dichloride is added such that the solution will have a Mg content of 0.45 to 0.60 millimoles/gram of solution. Heating is continued with stirring at 70 degrees C. for another eight hours. The mixture (solution) is then filtered through a 100 micron filter to remove undissolved magnesium dichloride and unreacted magnesium.

A nominally hydrophobic fumed silica having a particle size in the range of from 0.1 to 1 microns is added to the mixture prepared above over a period of about two hours. The mixture is stirred by means of a turbine agitator during this time and for several hours thereafter to thoroughly disperse the silica in the solution. The solution may be cooled to approximately 35° C. prior to addition of the fumed silica. Cab-O-Sil TS610 is used as the fumed silica. Sufficient fumed silica is added to provide a total Cab-O-Sil content of about 6 wt %.

The resulting slurry is spray dried using a closed cycle spray dryer equipped with a rotary atomizer. The rotary atomizer speed is adjusted to give catalyst particles with the desired D50. Drying Gas Inlet temperature is adjusted to obtain the final desired Tetrahydrofuran content of the catalyst precursor. Typical inlet temperatures range from 120-165° C. The scrubber portion of the spray dryer is maintained at a temperature of 0 to −10° C. to recover evaporated solvent.

The spray dried catalyst precursor contains 2 to 2.5 weight percent Ti, 5.5 to 7 weight percent Mg, and 22 to 30 weight percent THF. The discrete catalyst precursor particles are mixed with mineral oil under a nitrogen atmosphere in a vessel equipped with a turbine agitator to form a slurry containing approximately 28 weight percent of the solid catalyst precursor.

To partially activate the catalyst slurry, a 50 weight percent solution of tri-n-hexylaluminum (TnHAl) in mineral oil is added as the slurry is being pumped to the reactor. This mixture is held in a residence time vessel for roughly 1-4 hours, depending on the absolute feed rate of the catalyst. The TnHAl solution is employed in an amount sufficient to provide the desired molar ratio of TnHAl per mol of THF in the catalyst.

Subsequently, a 30 weight percent solution of diethylaluminum chloride (DEAC) in mineral oil is added and the mixture is held in another residence time vessel for roughly 1-4 hours, again depending on the absolute feed rate of the catalyst. The DEAC is employed in an amount sufficient to provide the desired molar ratio of DEAC per mol of THF in the catalyst. The partially activated catalyst then exits the second residence time vessel and goes directly into the polymerization reactor where it is fully activated with the final amount of cocatalyst.

As noted, the precursor is partially activated before polymerization. Activation is completed in the reactor via the cocatalyst. The cocatalyst is preferably added separately neat or as a solution in an inert solvent, such as isopentane, to the polymerization reactor at the same time as the flow of ethylene is initiated.

The entire catalyst system, which includes the partially activated precursor and the cocatalyst, is added to the first reactor. The catalyst system, i.e., the partially activated precursor and the cocatalyst, is admixed with the copolymer or homopolymer produced in the first reactor, and the mixture is transferred to the second reactor. Insofar as the catalyst system is concerned, only cocatalyst, if desired, is added to the second reactor from an outside source.

The polymerization in each reactor is conducted in the gas phase using a continuous fluidized bed process, but can also be conducted in slurry or solution. For example, U.S. Pat. No. 5,844,045, U.S. Pat. No. 5,869,575 and U.S. Pat. No. 6,448,341 describe, inter alia, solution interpolymerizations of ethylene and C3-C20 alpha-olefins using a homogeneous catalyst in at least one reactor and a heterogeneous catalyst in at least one other reactor. U.S. Pat. No. 6,566,446 (Parikh et al.) and U.S. Pat. No. 6,538,070 (Cardwell et al.) disclose ethylene interpolymerizations using a homogeneous catalyst in two different reactors, where the polymerization conditions vary so as to affect the reactivity of the catalysts. In all of these cases, the reactors can be operated sequentially or in parallel. All of these patents are incorporated by reference in their entirety.

The compositions can also be made by fractionating a heterogeneous ethylene/alpha-olefin polymer into specific polymer fractions with each fraction having a narrow composition (that is, branching) distribution, selecting the fraction having the specified properties, and blending the selected fraction in the appropriate amounts with another ethylene polymer. This method is obviously not as economical as the in-situ interpolymerizations of U.S. Pat. No. 5,844,045, U.S. Pat. No. 5,869,575 and U.S. Pat. No. 6,448,341, but can be used to obtain the compositions of the invention. All of these patents are incorporated by reference in their entirety.

Various other patents also disclose polymerization techniques, including U.S. Pat. No. 4,076,698 (Andersen et al.), U.S. Pat. No. 5,977,251 (Kao et al.) and WO 97/36942 (Kao et al.), the disclosures of each of which is incorporated herein by reference in their entirety.

The compositions disclosed herein can also be formed by any convenient method, including dry blending the individual components and subsequently melt mixing or by pre-melt mixing in a separate extruder (e.g., a Banbury mixer, a Haake mixer, a Brabender internal mixer, or a counter rotating or co-rotating twin screw extruder).

A relatively low density copolymer is usually prepared in the first reactor. The mixture of polymer and an active catalyst is preferably transferred from the first reactor to the second reactor via an interconnecting device using nitrogen or second reactor recycle gas as a transfer medium. A relatively high density copolymer is prepared in the second reactor. Alternatively, the high density copolymer can be prepared in the first reactor and the low density copolymer can be prepared in the second reactor.

The compositions have a broad molecular weight distribution which, as noted, can be characterized as bimodal. The broad molecular weight distribution is reflected in an Mw/Mn ratio of about 3 to about 10, preferably about 3 to about 8. Mw is the weight average molecular weight; Mn is the number average molecular weight; and the Mw/Mn ratio can be referred to as the polydispersity index, which is a measure of the breadth of the molecular weight distribution.

Polymerization Reaction Description For the Blend Composition

The weight ratio of copolymer prepared in the low density reactor to copolymer prepared in the high density reactor can be in the range of about 10:90 to about 90:10, and is preferably in the range of about 20:80 to about 80:20, most preferably in the range of about 20-30: 80-70. This is also known as the split. The transition metal based catalyst system including the cocatalyst, ethylene, alpha-olefin, and, optionally, hydrogen are continuously fed into the first reactor; the polymer/active catalyst mixture is continuously transferred from the first reactor to the second reactor; ethylene and, optionally, alpha-olefin and hydrogen, and cocatalyst are continuously fed to the second reactor. The final product is continuously removed from the second reactor. A preferred mode is to take batch quantities of product from the first reactor, and transfer these to the second reactor using the differential pressure generated by the recycle gas compression system. A system similar to that described in U.S. Pat. No. 4,621,952 is particularly useful.

The pressure is about the same in both the first and second reactors. Depending on the specific method used to transfer the mixture of polymer and contained catalyst from the first reactor to the second reactor, the second reactor pressure may be either higher than or somewhat lower than that of the first.

If the second reactor pressure is lower, this pressure differential can be used to facilitate transfer of the polymer catalyst mixture from Reactor 1 to Reactor 2. If the second reactor pressure is higher, the differential pressure across the cycle gas compressor may be used as the motive force to move polymer.

The pressure, i.e., the total pressure in the reactor, can be in the range of about 200 to about 500 psig (pounds per square inch gauge) and is preferably in the range of about 280 to about 450 psig. The ethylene partial pressure in the first reactor can be in the range of about 10 to about 150 psig, and is preferably in the range of about 20 to about 80 psig. The ethylene partial pressure in the second reactor is set according to the amount of copolymer it is desired to produce in this reactor to achieve the split mentioned above. It is noted that increasing the ethylene partial pressure in the first reactor leads to an increase in ethylene partial pressure in the second reactor. The balance of the total pressure is provided by alpha-olefin other than ethylene and an inert gas such as nitrogen. Other inert hydrocarbons, such as an induced condensing agent e.g., isopentane, hexane also contribute to the overall pressure in the reactor according to their vapor pressure under the temperature and pressure experienced in the reactor.

A typical fluidized bed reactor can be described as follows: The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is further described in U.S. Pat. No. 4,482,687. The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. The partially activated catalyst precursor is preferably injected into the fluidized bed as a solid or a mineral oil slurry. Activation is completed in the reactors by the cocatalyst. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate and/or the ethylene partial pressures in both reactors. This patent is incorporated by reference in its entirety.

The hydrogen:ethylene mole ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

The residence time of the mixture of reactants including gaseous and liquid reactants, catalyst, and resin in each fluidized bed can be in the range of about 1 to about 12 hours and is preferably in the range of about 2 to about 5 hours.

The reactors can be run in the condensing mode, if desired. The condensing mode is described in U.S. Pat. Nos. 4,543,399; 4,588,790; and 5,352,749. All of these patents are incorporated by reference in their entirety.

The blend can be produced from material made in two independent reactors (each using the same or different catalyst) with post reaction blending or in one reactor with two compatible catalysts which produce the required components under a single set of conditions. For the second case the catalysts can be fed separately or together.

As noted above, the gaseous materials used in the process can be introduced into the reactors via a recycle gas. The recycle gas is defined as a mixture of gases including ethylene per se or ethylene and one or more alpha-olefins, preferably one or two alpha-olefins, as comonomers and, optionally, one or more inert gases such as nitrogen (to make up the desired reactor pressure), inert hydrocarbons, and hydrogen. The alpha-olefins can be, for example, propylene, 1-butene, 1-hexene, 4-methyl-1-pentene, and 1-octene. The alpha-olefins usually have no more than 12 carbon atoms, and preferably, 3 to 8 carbon atoms. The recycle gas can also be referred to as the inlet gas or cycle gas.

As noted, the precursor is partially activated before polymerization. Activation is completed in the reactor via the cocatalyst. The cocatalyst is preferably added separately neat or as a solution in an inert solvent, such as isopentane, to the polymerization reactor at the same time as the flow of ethylene is initiated.

The polymerization is conducted in the gas phase using a continuous fluidized bed process. Melt index ($I_2$) is determined under ASTM D-1238, measured at 190° C. and 2.16 kilograms and reported as grams per 10 minutes or decigrams per minute. Flow index ($I_{21.6}$) is determined under ASTM D-1238, measured at 190° C. and 21.6 kg weight, and reported as grams per 10 minutes or decigrams per minute. Melt flow ratio is the ratio of flow index to melt index ($I_{21.6}/I_{2.16}$). The product, as removed from the reactor, can have a melt index in the range of about 0.02 to about 300 grams per 10 minutes, and preferably has a melt index in the range of about >0.04 to about 50 grams per 10 minutes. The melt flow ratio is in the range of about 20 to about 50, and is preferably in the range of about 20 to about 35. The density of the polymer is normally at least 0.900 gram per cubic centimeter, and is preferably in the range of 0.915 to 0.960 gram per cubic centimeter and even more preferably in the range of 0.935-0.955 gram per cubic centimeter and most preferably in the 0.940-0.950 gram per cubic centimeter density range.

Molecular Weight Distribution Determination

The molecular weight distributions of ethylene polymers are determined by gel permeation chromatography (GPC) on a Waters 150 C high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a^*(M_{polystyrene})^b.$$

In this equation, a=0.4316 and b=1.0. Weight average molecular weight, $M_w$, is calculated in the usual manner according to the following formula: $M_j = (\Sigma w_i(M_i^j))^j$; where $w_i$ is the weight fraction of the molecules with molecular weight $M_i$ eluting from the GPC column in fraction i and j=1 when calculating Mw and j=−1 when calculating $M_n$. The novel composition has $M_w/M_n$ less than or equal to 3.3, preferably less than or equal to 3, and especially in the range of from about 2.4 to about 3.

In the reactor for the blend composition: The mole ratio of alpha-olefin (if used) to ethylene can be in the range of about 0.01:1 to about 0.8:1, and is preferably in the range of about 0.005:1 to about 0.25:1. The mole ratio of hydrogen (if used) to ethylene can be in the range of about 0.001:1 to about 2:1, and is preferably in the range of about 0.05 to about 0.3:1. The operating temperature can be in the range of about 60 to 120° C., and is preferably in the range of about 80 to 110° C. Note that these ratios encompass hexene products only and do not cover a dual catalyst system which will require modification of the catalyst types and an estimation of the conditions for the catalyst type(s).

The pressure, i.e., the total pressure in the reactor, can be in the range of about 200 to about 500 psig (pounds per square inch gauge) and is preferably in the range of about 280 to about 450 psig. The ethylene partial pressure can be in the range of about 10 to about 200 psig, and is preferably in the range of about 60 to about 170 psig. The balance of the total pressure is provided by alpha-olefin (if used) and an inert gas such as nitrogen. Other inert hydrocarbons, such as an induced condensing agent e.g., isopentane, hexane also contribute to the overall pressure in the reactor according to their vapor pressure under the temperature and pressure experienced in the reactor. A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is further described in U.S. Pat. No. 4,482,687, which is incorporated by reference in its entirety.

The gaseous feed streams of ethylene, other gaseous alpha-olefins (if used), and hydrogen (if used) are preferably fed to the reactor recycle line as well as liquid alpha-olefins (if used). The activated catalyst precursor(s) are is preferably injected into the fluidized bed as a solid or a mineral oil slurry. The product composition can be varied by changing the molar ratios of the comonomers and hydrogen introduced into the fluidized bed as well as the ratio of the different catalysts used in a single reactor. The product is continuously discharged in granular or particulate form from the reactor as the bed level builds up with polymerization. The production rate is controlled by adjusting the catalyst feed rate and/or the ethylene partial pressures.

The hydrogen:ethylene mole ratio as well as the reactor temperature can be adjusted to control average molecular weights. The alpha-olefin:ethylene mole ratio can be adjusted to control the resin density.

The alpha-olefins (other than ethylene) can be present in a total amount of up to 15 percent by weight of the copolymer and, if used, are preferably included in the copolymer in a total amount of about 1 to about 12 percent by weight based on the weight of the copolymer.

The residence time of the mixture of reactants including gaseous and liquid reactants, catalyst, and resin in the fluidized bed can be in the range of about 1 to about 12 hours and is preferably in the range of about 1.5 to about 5 hours.

The reactor can be run in the condensing mode, if desired. The condensing mode is described in U.S. Pat. Nos. 4,543,399; 4,588,790; and 5,352,749.

The resin can be extruded in a conventional extruder adapted for that purpose. Extruders and processes for extrusion are described in U.S. Pat. Nos. 4,814,135; 4,857,600; 5,076,988; and 5,153,382. All of these patents are incorporated by reference in their entirety.

| Reactor Conditions For the Blend Components | | |
|---|---|---|
| Product | Resin B | Resin A |
| Reactor Temp, ° C. | 88 | 102 |
| Reactor Press., psig | 315 | 320 |
| C2PP, psig | 100 | 155 |
| $H_2/C_2$ (molar flow ratio) | 0.140 | 0.220 |
| $C_6/C_2$ (molar flow ratio) | 0.150 | 0.013 |
| Al/Ti (molar ratio) | 40 | 50 |
| $I_2$, g/10 min | 1.0 | 4.4 |
| Density, g/cm$^3$ | 0.918 | 0.952 |

Closures comprising the compositions of the invention can be made, for example, according to the teachings of U.S. Pat. No. 6,139,931 (Finkelstein et al.), U.S. Pat. No. 5,598,940 (Finkelstein et al.), U.S. Pat. No. 6,382,445 (McCandless), U.S. Pat. No. 5,000,992 (Kelch), U.S. Pat. No. 4,744,478, U.S. Pat. No. 4,744,478 (Hahn), U.S. Pat. No. 4,807,772 (Schloss) and U.S. Pat. No. 4,846,362 (Schloss). All of these patents are incorporated by reference in their entirety.

Liners, if used in accordance with the invention, can be made according to U.S. Pat. No. 4,984,703 (Burzynski), U.S. Pat. No. 5,137,164 (Bayer) and U.S. Pat. No. 4,872,573 (Johnson et al.). All of these patents are incorporated by reference in their entirety.

With respect to the relative concentrations of the blend components, in one embodiment, the blend may comprise (A) from about 10 to about 90 weight percent of an ethylene polymer having a density in the range of from about 0.947 to about 0.962 g/cm$^3$, a melt index of from about 1 to about 10 g/10 minutes, preferably from about 2 to about 8 g/10 min, more preferably from about 3 to about 7 g/10 min., (B) from about 90 to about 10 weight percent of an ethylene polymer having a density in the range of from about 0.912 to about 0.932 g/cm$^3$, a melt index of from about 0.25 to about 6 g/10 minutes, preferably from about 0.5 to about 4 g/10 min., more preferably from about 0.75 to about 3 g/10 min., and (C) from 0 to 6 weight percent of additives selected from the group consisting of color enhancers, lubricants, fillers, pigments, antioxidants, and processing aids, a preferred range of from 0.01 to 3 weight percent and most preferred range as 0.015 to 0.5 weight percent, where the difference of the densities of components (A) and (B) (ΔD=D(A)−D(B)) is equal or greater than 0.03 g/cm$^3$.

Intermediate ranges (i.e.,) where component A is from about 40 to 85 weight percent and component B is from about 15 to 60 weight percent, or where component A is from about 65 to 80 weight percent and component B is from about 20 to 35 weight percent, are expressly part of the specification. Those having ordinary skill in the art will appreciate that the relative percentages of A and B may be altered as necessary.

Specific Catalyst Description and Polymerization Conditions for the Single Component Resin Composition A single unimodal resin is made in the following manner: In a gas phase process for the manufacture of polymers contacting ethylene and 1-hexene comonomer in a fluidized bed reactor with a catalyst system comprising a catalytically active chromium or chromium-titanium complex supported on refractory oxide material in which at least seventy (70%) of the total pore volume of such material ranges in pores of diameter between about 200 to 500 angstroms, which supported complex has been activated by heating in the presence of oxygen at a temperature varying from about 600° C. to the sintering temperature of the supported complex.

Oxygen add-back to the polymerization reactor may be used at an O2/C2 molar flow ratio of up to 250 ppbm to increase the MI and resin density, which then requires increased comonomer incorporation to produce the equivalent density. U.S. Pat. No. 6,022,933 describes this process in detail, and is incorporated by reference in its entirety. Typically the resin properties are in the 0.3-1.2 MI range (ASTM D-1238 Cond E) and density (ASTM D-1505) in the 935-955 gm/m3 range. 1-hexene, 1-octene, 4-methyl 1-pentene, or other alpha olefin comonomers with molecular weight greater than propylene are used. In the example a 0.8 MI and 945 density ethylene-hexene copolymer was selected for evaluation. When tested in the soda bottle closure application all required properties were met after the addition of 200 ppmw Carbowax™ 400, which improve color to acceptable levels. Optionally, 1000 ppmw of HPN™ 68 maybe added to the resin sample as a nucleator. Typical antioxidants were added for processability and long term stability.

Additives may be used in conjunction with the polymer resins disclosed herein. The additives may be used to improve various properties (ESCR, color, taste, etc.). For example, in the case where polyethylene (e.g., ethylene/hexene copolymer) is made with chromium catalyst, it exhibits significantly better environmental stress crack resistance (ESCR) and color properties when a dialkyl zinc compound, such as diethyl zinc is added during polymerization preferably at a mole ratio of Zn:Cr of 10:1 to 80:1, more preferably 50:1 to 70:1.

Reactor Conditions for the Single Component Chromium catalyzed Product
Reactor Conditions:

|  | | Units |
|---|---|---|
| O2/C2 Molar Flow Ratio | 280 | ppbm |
| Fluidized Bed Control Temperature | 103.7 | ° C. |
| C6/C2 Molar Concentration Ratio | 0.0040 | mol/mol |
| C6/C2 Molar Flow Ratio | 0.020 | mol/mol |
| Superficial Gas Velocity | 2.53 | ft/sec |

-continued

|  | | Units |
|---|---|---|
| Isopentane Molar Concentration | 2.7 | mol % |
| Catalyst Productivity | 3,800 | lb/lb |
| Upper Fluidized Bulk Density (FBD) | 15.5 | lb/ft^3 |
| Lower Fluidized Bulk Density (FBD) | 17.7 | lb/ft^3 |
| Fluidized Bed Weight | 132.2 | Mpph |
| Production Rate | 64.8 | Mpph |

| Property | Average | Units |
|---|---|---|
| Melt Index, ASTM D-1238 cond E. | 0.86 | dg/min |
| Melt Flow Index, ASTM D-1238 cond F. | 59.6 | dg/min |
| Melt Flow Ratio, (I21/I2) | 68.7 | NA |
| Density, ASTM D-792 | 0.9453 | g/cc |
| Avg. Particle Size, ASTM D-1921 | 0.021 | inches |

The transition metal-based catalyst system(s), including the activated precursor and ethylene, and optionally the alpha-olefin comonomer(s) and hydrogen, are fed continuously to the reactor. The polyethylene resin produced is semi-continuously removed from the reactor.

Additives:

The antioxidant additive formulation for the blend include, but are not limited to:

390 ppm of Trisnonylphenyl Phospite (known as Weston™ 399)

750 ppm of Zinc Stearate 510 ppm Octadecyl-3,5-di-tbutyl-4-hydroxyhydrocinnamate 210 ppm Zinc Oxide There are many other stabilization packages known to those skilled in the art that accomplish polymer stabilization suitable for this application.

A fluoroelastomer processing additive, such as Dynamar™ FX-5911 at levels of up to about 500 ppmw, can be employed to reduce the surface imperfections and melt fracture during extrusion and compression molding.

Additive Package for the Single Component Chromium Catalyzed Product

Four possible antioxidant additive formulations for the blend include, but are not limited to:

Formulation 1
    350 ppm of Igranox™ 3114 (I-3114)
    200 ppm of Carbowax™ 400 (C-400)
Formulation 2
    350 ppm of Igranox™ 1010 (I-1010)
    200 ppm of Carbowax™ 400
Formulation 3
    350 ppm of Igranox™ 3114,
    400 ppm of Irgafos™ 168 (I-168)
    200 ppm of Carbowax™ 400
Formulation 4
    350 ppm of Igranox™ 1010
    400 ppm of Irgafos™ 168
    200 ppm of Carbowax™ 400

With respect to additives, one of ordinary skill in the art will appreciate that one or more additives may be used in combination. In selected embodiments, one or more additives may constitute from about 0.01 to about 6 weight percent of the composition. In other embodiments, additives may be present in an amount from 0.01 to about 3 weight percent. In yet other embodiments, additives may be present in an amount from 0.015 to 0.5 weight percent. However, other amounts of additives may be used in accordance with embodiments of the present invention, so long as desired performance is maintained.

With respect to processing, those of ordinary skill in the art will appreciate that polymer gels may form under certain processing conditions. This may make processing of high molecular weight polymers difficult. One solution is to melt the composition (which may be the blend described above); and, prior to extrusion or pelletizing, pass the molten blend through one or more active screens, in the case of two or more active screens, positioned in series. In one embodiment, coarse screens (i.e., 20 to 40 mesh) may be used. In alternative embodiments, fine screens (250 to 325 mesh) may be used. In yet another embodiment, combinations of fine and coarse screens may be used. This process may be improved through the use of computational fluid dynamic (CFD) modeling. CFD may be used to design screens such that the probability of a polymer gel droplet impacting a wire on a coarse screen, which may cause the droplet to split. Those having ordinary skill will recognize that other filters may be used (such as commonly available "zero aperture" filter cloth (i.e., plain Dutch weave, twilled Dutch weave, etc.).

Test Methods

C13 NMR

Short chain branching distribution and comonomer content is measured using C13 NMR, as discussed in Randall, Rev. Macromol. Chem. Chys., C29 (2&3), pp. 285-297, and in U.S. Pat. No. 5,292,845, the disclosures of which are incorporated herein by reference. The samples were prepared by adding approximately 3 g of a 50/50 mixture of tetrachloroethane-d2/orthodichlorobenzene that is 0.025 M in chromium acetylacetonate (relaxation agent) to 0.4 g sample in a 10 mm NMR tube. The samples were dissolved and homogenized by heating the tube and its contents to 150° C. The data was collected using a JEOL Eclipse 400 MHz NMR spectrometer, corresponding to a 13C resonance frequency of 100.6 MHz. Acquisition parameters were selected to ensure quantitative 13C data acquisition in the presence of the relaxation agent. The data was acquired using gated 1H decoupling, 4000 transients per data file, a 4.7 sec relaxation delay and 1.3 sec acquisition time, a spectral width of 24,200 Hz and a file size of 64K data points, with the probe head heated to 130° C. The spectra were referenced to the methylene peak at 30 ppm. The results were calculated using ASTM method D5017-91.

CRYSTAF (Crystallization Analytical Fractionation) is measured and determined according to the following publications:

An experimental and numerical study on crystallization analysis fractionation (crystaf). Anantawaraskul, Siripon; Soares, Joao B. P.; Wood-Adams, Paula M. Department of Chemical Engineering, McGill University, Montreal, QC, Can. Macromolecular Symposia (2004), 206(Polymer Reaction Engineering V), 57-68.

13C NMR, GPC, and DSC study on a propylene-ethylene-1-butene terpolymer fractionated by temperature rising elution fractionation. Zhang, Yu-Dong; Gou, Qing-Qiang; Wang, Jun; Wu, Chang-Jiang; Qiao, Jin-Liang. Beijing Research Institute of Chemical Industry. SINOPEC, Beijing, Peop. Rep. China. Polymer Journal (Tokyo, Japan) (2003), 35(7), 551-559.

Effect of molecular weight and average comonomer content on the crystallization analysis fractionation (Crystaf) of ethylene a-olefin copolymers. Anantawaraskul, Siripon; Soares, Joao B. P.; Wood-Adams, Paula M. Monrabal Benjamin. Department of Chemical Engineering, McGill University, Montreal, QC, Can. Polymer (2003), 44(8), 2393-2401.

Ethylene/1-hexene copolymers synthesized with a single-site catalyst: Crystallization analysis fractionation, modeling, and reactivity ratio estimation. Sarzotti, Deborah M.; Soares, Joao B. P.; Penlidis, Alexander. Institute for Polymer Research, Department of Chemical Engineering, University of Waterloo, Waterloo, ON, Can. Journal of Polymer Science, Part B: Polymer Physics (2002), 40(23), 2595-2611.

COLOR: The ASTM test method used was D-1925-88. YI=yellowness index.

Tensile properties: These were measured via ASTM-D638 on type IV speciments when made in accordance with ASTM D-4976 in preparing the plaque.

Melt index properties: These were measured in accordance with ASTM D-1238 conditions (190, 2.16) and (190, 21.6)

MFR=MI21/MI2 or ASTM D-1238 (190, 2.16/190, 21.6)

Density: These were measured in accordance with ASTM D-792.

Flexural Modulus: These were measured in accordance with ASTM D-790 when the plaques were made in accordance with ASTM D-4976 in preparing the plaque.

Notched Izod: These were measures in accordance with ASTM D-256 when the plaques were made in accordance with ASTM D-4976 in preparing the plaque.

Average Particle Size: ASTM D-1921.

EXAMPLES

Example 1-3

The Blend Composition Properties

Example 1

A 3:1 ratio (75 weight percent Resin A to 25 weight percent Resin B) blend of Resin A to Resin B is evaluated Examples 2 and 3 are also shown in the tables below:

|  |  |  | Example 1 (Third Blending) 75%:25% Resin A:Resin B |
|---|---|---|---|
|  | Average Density | g/cm$^3$ | 0.9452 |
| ESCR* - 100% of IGEPAL CO 630 |  |  |  |
|  | 1$^{st}$ Break | hr | 121 |
|  | 2$^{nd}$ Break | hr | 160 |
|  | 3$^{rd}$ Break | hr | 208 |
|  | 4$^{th}$ Break | hr | 215 |
|  | 5$^{th}$ Break | hr | 256 |
|  | 6$^{th}$ Break | hr | 329 |
|  | 7$^{th}$ Break | hr | 377 |
|  | 8$^{th}$ Break | hr | nm |
|  | 9$^{th}$ Break | hr | nm |
|  | 10$^{th}$ Break | hr | 496 |
|  | Elapsed Time | hr | 496 |
| F$_{50}$ hours |  | hr | 283.5 |
|  | Melt Index - I$_2$ | g/10 minutes | 3.13 |
| Tensile - Molded specimens per ASTM D-4976 | Avg Thickness | inches | 0.067 |
|  | Avg Width | inches | 0.25 |
|  | Avg Yield Strain | % | 5.868 |
|  | Avg Yield Strength | psi | 3271.5 |

*Environmental Stress Crack Resistance
Resin A = ethylene/1-hexene copolymer having a melt index (I$_2$) of about 4 g/10 min., Mw/Mn of about 4, and a density of about 0.952 g/cm$^3$
Resin B = ethylene/1-hexene copolymer having a melt index (I$_2$) of about 1 g/10 min., Mw/Mn of about 4, and a density of about 0.918 g/cm$^3$

|  | Test Conditions# | Units | Example 1 Blend Data 25:75 Resin B:Resin A Initial Blend | Example 1 Blend Data 25:75 Resin B:Resin A Second Blend | Example 2 Blend 20:80 Resin B:Resin A | Example 3 Blend 30:70 Resin B:Resin A |
|---|---|---|---|---|---|---|
| Density | ASTM D 792 | g/cm$^3$ | 0.944 | 0.945 | nm | nm |
| $I_2$ | ASTM D 1238 (190/2.16) | g/10 min | 3.4 | 2.9 | nm | nm |
| ESCR | ASTM D-1693 cond B 10% IGEPAL | 50% probability failure (hr) | 168 | >172 | >172 | >172 |
|  | ASTM D-1693 cond B 100% IGEPAL | 50% probability failure (hr) | nm | >172 | >172 | >172 |
| Tensile | Yield | psi | 3160 | 3100 | nm | nm |
|  | Elongation at Yield | % | 6.2 | 7.7 | nm | nm |
| Flexural | Tangent Modulus | Psi | nm | 162,000 | nm | nm |
|  | 1% Secant Modulus | Psi | nm | 131,000 | nm | nm |
|  | 2% Secant Modulus | Psi | nm | 110,000 | nm | nm |
| Notched Izod | ASTM D-256 | Ft-lbs./in | nm | 7.7 | nm | nm |
| DSC | $T_m$ | ° C. | nm | 130 | nm | nm |
| Atref HD Fraction (%) |  |  |  | 72.4 |  |  |
| ATref Purge Fraction (%) |  |  |  | 12.4 |  |  |
| ATref SCBD Fraction (%) |  |  |  | 15.2 |  |  |
| Total |  |  |  | 100.0 |  |  |
| Crystaf Soluable Fraction (%) |  |  |  | 3.0 |  |  | nm = not measured;

Example 4

The Single Resin Composition

| Additive Package Properties | ASTM Test | Customer Targets | Example 4 350 ppm Irganox 3114 and 200 ppm Carbowax 400 | Competitive Product Samsung C430A |
|---|---|---|---|---|
| MI2 (g/10 min) | D-1238 cond E |  | 0.69 | 1.65 |
| Density ASTM (g/cc) | D-792 |  | 0.9465 | 0.9574 |
| ESCR $F_{50}$ (hrs) 10% Igepal at 50 C. | D-1693 Cond B |  | 187 | 61.7 |
| Repeat ESCR $F_{50}$ (hrs) 10% Igepal at 50 C. | D-1693 Cond B |  |  | 59.7 |
| ESCR $F_{50}$ (hrs) 100% Igepal at 50 C. | D-1693 Cond B | >80 | 3248 | 74.3 |
| Repeat ESCR $F_{50}$ (hrs) 100% Igepal at 50 C. | D-1693 Cond B | >80 |  | 57.1 |
| Tensile Strength @ Bk (PSI) | D638 with Type IV specimen |  | 2217 | 3014 |
| % Elongation @ Bk | D638 with Type IV specimen |  | 543 | 935 |
| Yiled Strength (psi) | D638 with Type IV specimen | 3000-4000 | 3482 | 4345 |
| % Elongation at Yield | D638 with Type IV specimen |  | 6.6 | 7.7 |
| Atref HD Fraction (%) | Dow Method |  | 78.2 | 85.4 |
| Atref purge fraction (%) | Dow Method |  | 8.3 | 7.2 |
| Atref SCBD fraction (%) | Dow Method |  | 13.5 | 7.4 |
| Total |  |  | 100.0 | 100.0 |
| Crystaf Soluable fraction (%) | Dow Method |  | 2.9 | 1.4 |
| Color | ASTM D-1925-88 |  | YI = −2.47 |  |
| Taste | Dow Method |  |  | Product has less taste than the unmodified control |

Color Data Set on resin from example 4. Formulations B, D, F, and H all containing Carbowax 400 at 200 ppm have the best color. YI=yellowness Index

| Formulation | Additives in ppm's | | | | Ave YI | Standard Deviation | YI Readings | | |
|---|---|---|---|---|---|---|---|---|---|
| | I-1010 | C-400 | I-168 | I-3114 | | | 1 | 2 | 3 |
| A | 350 | | | | 0.97 | 0.042 | 0.94 | 1.02 | 0.96 |
| B | 350 | 200 | | | −2.37 | 0.020 | −2.35 | −2.39 | −2.37 |
| C | 350 | | 400 | | 0.78 | 0.052 | 0.84 | 0.75 | 0.75 |
| D | 350 | 200 | 400 | | −2.35 | 0.042 | −2.38 | −2.36 | −2.30 |
| E | | | | 350 | 1.56 | 0.046 | 1.52 | 1.61 | 1.55 |
| F | | 200 | | 350 | −2.47 | 0.026 | −2.49 | −2.44 | −2.48 |
| G | | | 400 | 350 | 1.68 | 0.046 | 1.69 | 1.63 | 1.72 |
| H | | 200 | 400 | 350 | −2.28 | 0.020 | −2.30 | −2.28 | −2.26 |

Those having ordinary skill in the art will appreciate that any convenient method of forming a closure, using the compounds disclosed herein, may be used.

Advantageously, selected embodiments of the present invention provide polymer compositions having useful properties. In particular, in select embodiments, polymer compositions formed in accordance with embodiments of the present invention have advantageous properties for use as closures, when compared to prior art compositions.

The invention claimed is:

1. A polyethylene blend composition obtained in a two staged first and second reactors connected in series with a catalyst fed into the first reactor via a catalyst feed tube to produce a first ethylene polymer, wherein a mixture of said first ethylene polymer and active catalyst is transferred from the first reactor to the second reactor in which a second ethylene polymer is prepared and blended in situ with the first ethylene polymer, wherein said polyethylene blend composition comprises:
   a) from 10 to 90 weight percent of said first ethylene polymer having a density in a range of from 0.947 to 0.962 g/cm$^3$, a melt index of from 1 to 10 g/10 minutes,
   b) from 90 to 10 weight percent of said second ethylene polymer having a density in a range of from 0.918 to 0.932 g/cm$^3$, a melt index of from 0.25 to 6 g/10 minutes, wherein the difference of densities of said first ethylene polymer (A) and said second ethylene polymer (B) ($\Delta D = D_{(A)} - D_{(B)}$) is equal to or greater than 0.03 g/cm$^3$,
   wherein said polyethylene blend composition includes from 0.05 to 5 percent per weight of 1-hexene based on total weight of said composition; and
   wherein said polyethylene blend composition has an Environmental Stress Crack Resistance according to ASTM D-1693 procedure B with 100% Branched Octylphenoxy Poly (Ethyleneoxy) Ethanol, exceeding 80 hours.

2. The polyethylene blend composition of claim 1, wherein said first ethylene polymer is present in about 40 to 85 weight percent and said second ethylene polymer is present in an amount from 15 to 60 weight percent.

3. The polyethylene blend composition of claim 2, wherein said first ethylene polymer is present in 65 to 80 weight percent and said second ethylene polymer is present in an amount from 20 to 35 weight percent.

4. The polyethylene blend composition of claim 1, further comprises from 0 to 6 weight percent of at least one additive selected from the group consisting of lubricants, fillers, pigments, antioxidants, and processing aids.

5. The polyethylene blend composition of claim 4, wherein the at least one additive is present in 0.01 to 3 weight percent.

6. The polyethylene blend composition of claim 4, wherein the at least one additive is present in 0.015 to 0.5 weight percent.

7. A closure comprising the polyethylene blend composition of claim 1.

8. A closure comprising the polyethylene blend composition of claim 1, wherein said polyethylene blend composition has a short chain branching distribution content in the range of from 8% to 25%.

9. The polyethylene blend composition of claim 1, wherein the polyethylene blend composition is characterized as having a 1-hexene content of from 0.5 weight percent to 4 weight percent.

10. The polyethylene blend composition of claim 1, wherein the polyethylene blend composition is characterized as having a soluble fraction greater than 1.75% (as determined via CRYSTAF).

11. The polyethylene blend composition of claim 1, wherein said polyethylene blend composition has an Environmental Stress Crack Resistance according to ASTM D-1693 procedure B with 100% Branched Octylphenoxy Poly(Ethyleneoxy) Ethanol exceeding 150 hours.

12. A method of forming a closure comprising forming the polyethylene blend composition of claim 1 into a closure.

13. A method for producing a polyethylene blend composition comprising:
   polymerizing ethylene and one or more alpha-olefin in a two staged first and second reactors connected in series with a catalyst fed into the first reactor via a catalyst feed tube, wherein a mixture of a first ethylene polymer and active catalyst is transferred from the first reactor to the second reactor in which a second ethylene polymer is prepared and blended in situ with the first ethylene polymer, wherein said polyethylene blend composition comprises:
   a) from 10 to 90 weight percent of said first ethylene polymer having a density in a range of from 0.947 to 0.962 g/cm$^3$, a melt index of from 1 to 10 g/10 minutes,
   b) from 90 to 10 weight percent of said second ethylene polymer having a density in a range of from 0.918 to 0.932 g/cm$^3$, a melt index of from 0.25 to 6 g/10 minutes, wherein the difference of densities of said first ethylene polymer (A) and said second ethylene polymer (B) ($\Delta D = D_{(A)} - D_{(B)}$) is equal to or greater than 0.03 g/cm$^3$,
   wherein said polyethylene blend composition includes from 0.05 to 5 percent per weight of 1-hexene based on total weight of said composition; and
   wherein said polyethylene blend composition has an Environmental Stress Crack Resistance according to ASTM D-1693 procedure B with 100% Branched Octylphenoxy Poly (Ethyleneoxy) Ethanol, exceeding 80 hours.

* * * * *